(12) United States Patent
Hudis et al.

(10) Patent No.: US 8,413,247 B2
(45) Date of Patent: *Apr. 2, 2013

(54) ADAPTIVE DATA COLLECTION FOR ROOT-CAUSE ANALYSIS AND INTRUSION DETECTION

(75) Inventors: Efim Hudis, Bellevue, WA (US); Yair Helman, Kefar Neter (IL); Joseph Malka, Haifa (IL); Uri Barash, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1162 days.

This patent is subject to a terminal disclaimer.

(21) Appl. No.: 11/717,978

(22) Filed: Mar. 14, 2007

(65) Prior Publication Data
US 2008/0229421 A1 Sep. 18, 2008

(51) Int. Cl.
*G06F 21/00* (2006.01)
(52) U.S. Cl. ............. 726/25; 726/27; 713/156; 709/224
(58) Field of Classification Search .................. 713/156; 726/25, 26; 709/223, 224
See application file for complete search history.

(56) References Cited

U.S. PATENT DOCUMENTS

| | | | |
|---|---|---|---|
| 5,948,104 A | 9/1999 | Gluck et al. | |
| 5,983,270 A | 11/1999 | Abraham et al. | |
| 6,226,372 B1 | 5/2001 | Beebe et al. | |
| 6,321,338 B1 | 11/2001 | Porras et al. | |
| 6,353,385 B1 | 3/2002 | Molini et al. | |
| 6,530,024 B1 * | 3/2003 | Proctor | 726/23 |
| 6,647,400 B1 | 11/2003 | Moran | |
| 6,772,345 B1 | 8/2004 | Shetty | |
| 6,925,443 B1 | 8/2005 | Baggett, Jr. et al. | |
| 6,986,060 B1 | 1/2006 | Wong | |
| 6,990,591 B1 | 1/2006 | Pearson | |
| 7,028,338 B1 | 4/2006 | Norris et al. | |
| 7,065,657 B1 | 6/2006 | Moran | |
| 7,093,294 B2 | 8/2006 | Lingafelt et al. | |
| 7,120,934 B2 | 10/2006 | Ishikawa | |

(Continued)

FOREIGN PATENT DOCUMENTS

| | | |
|---|---|---|
| KR | 10-2001-0085057 A | 9/2001 |
| KR | 10-2003-0039149 A | 5/2003 |

(Continued)

OTHER PUBLICATIONS

Office Action received for U.S. Appl. No. 11/724,061, mailed on Feb. 24, 2011, 22 pages.

(Continued)

*Primary Examiner* — Beemnet Dada
*Assistant Examiner* — Sayed Beheshti Shirazi (57) ABSTRACT

Endpoints in an enterprise security environment are configured to adaptively switch from their normal data collection mode to a long-term, detailed data collection mode where advanced analyses are applied to the collected detailed data. Such adaptive data collection and analysis is triggered upon the receipt of a security assessment of a particular type, where a security assessment is defined as a tentative assignment by an endpoint of broader contextual meaning to information (i.e., data in some context) that is collected about an object of interest. A specialized endpoint is coupled to the security assessment channel and performs as a centralized audit point by subscribing to all security assessments, logging the security assessments, and also logging the local actions taken by endpoints in response to detected security incidents in the environment. The specialized endpoint is arranged to perform various analyses and processes on historical security assessments.

20 Claims, 9 Drawing Sheets

U.S. PATENT DOCUMENTS

| | | | |
|---|---|---|---|
| 7,124,438 B2 | 10/2006 | Judge et al. | |
| 7,134,141 B2 | 11/2006 | Crosbie et al. | |
| 7,152,105 B2 | 12/2006 | McClure et al. | |
| 7,152,242 B2 | 12/2006 | Douglas | |
| 7,162,649 B1 | 1/2007 | Ide et al. | |
| 7,174,566 B2 | 2/2007 | Yadav | |
| 7,178,166 B1 | 2/2007 | Taylor et al. | |
| 7,319,951 B2* | 1/2008 | Rising et al. | 704/9 |
| 7,325,252 B2 | 1/2008 | Bunker et al. | |
| 7,346,922 B2 | 3/2008 | Miliefsky | |
| 7,451,488 B2 | 11/2008 | Cooper et al. | |
| 7,458,094 B2 | 11/2008 | Jackson | |
| 7,530,104 B1 | 5/2009 | Thrower et al. | |
| 7,558,848 B1 | 7/2009 | Shokhor | |
| 7,614,085 B2 | 11/2009 | Ben-Itzhak | |
| 7,644,271 B1 | 1/2010 | Cherepov et al. | |
| 7,647,622 B1 | 1/2010 | Sobel et al. | |
| 7,661,136 B1 | 2/2010 | Spielman | |
| 7,793,338 B1 | 9/2010 | Beddoe et al. | |
| 2003/0051163 A1 | 3/2003 | Bidaud | |
| 2003/0120955 A1 | 6/2003 | Bartal et al. | |
| 2003/0126449 A1 | 7/2003 | Kelly et al. | |
| 2003/0131256 A1 | 7/2003 | Ackroyd | |
| 2003/0159069 A1 | 8/2003 | Choi et al. | |
| 2003/0208689 A1 | 11/2003 | Garza | |
| 2004/0010709 A1 | 1/2004 | Baudoin et al. | |
| 2004/0025042 A1 | 2/2004 | Kouznetsov et al. | |
| 2004/0098623 A1 | 5/2004 | Scheidell | |
| 2004/0111643 A1 | 6/2004 | Farmer | |
| 2004/0255167 A1 | 12/2004 | Knight | |
| 2004/0260733 A1 | 12/2004 | Adelstein et al. | |
| 2004/0260778 A1 | 12/2004 | Banister et al. | |
| 2004/0260945 A1 | 12/2004 | Raikar et al. | |
| 2005/0015626 A1* | 1/2005 | Chasin | 713/201 |
| 2005/0033989 A1 | 2/2005 | Poletto et al. | |
| 2005/0050318 A1* | 3/2005 | Alone et al. | 713/155 |
| 2005/0076238 A1 | 4/2005 | Ormazabal et al. | |
| 2005/0080816 A1 | 4/2005 | Shipp | |
| 2005/0086534 A1 | 4/2005 | Hindawi et al. | |
| 2005/0102534 A1 | 5/2005 | Wong | |
| 2005/0114658 A1 | 5/2005 | Dye et al. | |
| 2005/0132041 A1* | 6/2005 | Kundu | 709/224 |
| 2005/0188272 A1 | 8/2005 | Bodorin et al. | |
| 2005/0204169 A1 | 9/2005 | Tonnesen | |
| 2005/0204404 A1 | 9/2005 | Hrabik et al. | |
| 2005/0251570 A1 | 11/2005 | Heasman et al. | |
| 2005/0257267 A1 | 11/2005 | Williams et al. | |
| 2005/0268112 A1 | 12/2005 | Wang et al. | |
| 2005/0289649 A1 | 12/2005 | Mitomo et al. | |
| 2006/0005254 A1* | 1/2006 | Ross | 726/27 |
| 2006/0018466 A1 | 1/2006 | Adelstein et al. | |
| 2006/0031938 A1* | 2/2006 | Choi | 726/25 |
| 2006/0070130 A1 | 3/2006 | Costea et al. | |
| 2006/0075494 A1 | 4/2006 | Bertman et al. | |
| 2006/0080637 A1 | 4/2006 | Treit et al. | |
| 2006/0123478 A1 | 6/2006 | Rehfuss et al. | |
| 2006/0130139 A1 | 6/2006 | Sobel et al. | |
| 2006/0179296 A1* | 8/2006 | Bartlett et al. | 713/152 |
| 2006/0202999 A1* | 9/2006 | Thornton | 345/531 |
| 2006/0224724 A1 | 10/2006 | Marinescu et al. | |
| 2006/0236392 A1 | 10/2006 | Thomas et al. | |
| 2006/0236401 A1 | 10/2006 | Fosdick | |
| 2006/0259819 A1 | 11/2006 | Connor | |
| 2006/0259968 A1 | 11/2006 | Nakakoji et al. | |
| 2006/0265689 A1 | 11/2006 | Kuznetsov et al. | |
| 2006/0268112 A1 | 11/2006 | Ikeda | |
| 2006/0272011 A1 | 11/2006 | Ide et al. | |
| 2006/0272859 A1* | 12/2006 | Pastusek et al. | 175/40 |
| 2006/0294588 A1 | 12/2006 | Lahann et al. | |
| 2007/0006310 A1 | 1/2007 | Piccard | |
| 2007/0016951 A1 | 1/2007 | Piccard et al. | |
| 2007/0094491 A1* | 4/2007 | Teo et al. | 713/153 |
| 2007/0100835 A1 | 5/2007 | Carter | |
| 2007/0101440 A1 | 5/2007 | Bhatia et al. | |
| 2007/0153689 A1* | 7/2007 | Strub et al. | 370/230 |
| 2007/0261120 A1* | 11/2007 | Arbaugh et al. | 726/26 |
| 2008/0046556 A1 | 2/2008 | Nicholls et al. | |
| 2008/0127337 A1* | 5/2008 | Dawson et al. | 726/22 |
| 2008/0134289 A1* | 6/2008 | McConnell et al. | 726/3 |

FOREIGN PATENT DOCUMENTS

| | | | |
|---|---|---|---|
| KR | 10-2003-0057929 A | 7/2003 | |
| WO | 02/097587 A2 | 12/2002 | |
| WO | 03/093960 A2 | 11/2003 | |
| WO | 2006/047163 A2 | 5/2006 | |

OTHER PUBLICATIONS

Office Action received for U.S. Appl. No. 11/724,061, mailed on Aug. 4, 2010, 19 Pages.

International Search Report received for PCT Application No. PCT/US2008/057164, mailed on Aug. 22, 2008, 3 pages.

Office Action received for U.S. Appl. No. 11/724,060, mailed on Mar. 3, 2011, 22 pages.

Office Action received for U.S. Appl. No. 11/724,060, mailed on Jul. 28, 2010, 18 pages.

Alvarez et al., "A new taxonomy of Web attacks suitable for efficient encoding", Elsevier, Computers & Security, vol. 22, Issue 5, Jul. 2003, pp. 435-449.

Harris et al., "Standards for Secure Data Sharing Across Organizations", Elsevier, ScienceDirect, Computer Standards and Interfaces, vol. 29, Issue 1, Jan. 2007, pp. 86-96.

Mahambre et al., "A Taxonomy and Classification of Adaptive Event Based Middleware with Support for Service Guarantees", Nov. 15, 2006, 8 pages.

"Firstdraft text of X.crs: 1-15 Correlative Reacting System in mobile data communication; TD 2442 Rev.1", ITU-T Drafts; Study Period 2005-2008, International Telecommunication Union, Geneva, CH, val. Study Group 17, 9/17, Dec. 6, 2006, pp. 1-53.

Kamara, et al., "Analysis of Vulnerabilities in Internet Firewalls", Apr. 2003, 17 pages.

Mayer, et al., "Fang: A Firewall Analysis Engine," 2000, 11 pages.

Zaffar et al., "Cooperative Forensics Sharing" In: 1st Bio-Inspired models of Network, Information and Computing Systems Conference 2003, Dec. 2006, pp. 1-9.

Danielsson, "A System for collection and Analysis of Forensic Evidence", Nov. 2, 2003, pp. 1-78.

Broucek, et al. "Intrusion Detection: Forensic Computing Insights arising from a Case Study on SNORT", EICR Conference Best Paper Proceedings 2003, 19 pages.

International Search Report and Written Opinion received for PCT Application No. PCT/US2008/065501, mailed on Dec. 24, 2008, 3 pages.

Al-Hammadi et al., "Detecting Botnets Through Log Correlation", University of Nottingham, Nottingham UK, 2006, 4 pages.

Abad et al., "Log Correlation for Intrusion Detection: A Proof of Concept", National Center for Advanced Secure Systems Research, 2003, 10 pages.

Levine et al., "The Use of Honeynets to Detect Exploited Systems Across Large Enterprise Networks", Proceedings of the 2003 IEEE, Jun. 2003, 8 pages.

International Search Report and Written Opinion received for PCT Application No. PCT/US2008/058189, mailed on Aug. 28, 2008, 3 pages.

"EMCO Network Malware Cleaner" retrieved at: <http://www.emco.is/networkmailwarecleaner/features.html>, Feb. 14, 2007, 6 pages.

Norman SandBox Product Suite- areas of application, retrieved at: <http://www.norman/com/microsites/mailwareanalyzer/ technology/37799len>, retrieved on Feb. 14, 2007, 2 pages.

Ding, "An Extended Immune-based Model for Computer Forensics", International Conference on Computer Science and Software Engineering, 2008, vol. 1, Dec. 12, 2008, pp. 1166-1169.

Beckett, et al., "Digital Forensics: Validation and Verification in a Dynamic Work Environment", IEEE Computer Society, Proceedings of the 40th Annual Hawaii International Conference on System Sciences, Jan. 2007, 10 pages.

Chandrasekaran, et al.,"AVARE: Aggregated Vulnerability Assessment and Response against Zero-day Exploits", Performance, Computing, and Communications Conference, 2006, 25th IEEE International Conference, Apr. 10-12, 2006, 8 pages.

International Search Report and Written Opinion received for PCT Application No. PCT/US2008/065499, mailed on Apr. 16, 2009, 10 pages.

Payer, "Realtime Intrusion-Forensics A First Prototype Implementation", (based on a stack-based NIDS), Selected Papers from the TERENA Networking Conference, 2004, 8 pages.

Extended European Search Report for application No. 08732311.9, dated May 31, 2012, 9 pages.

* cited by examiner

ADAPTIVE DATA COLLECTION FOR ROOT-CAUSE ANALYSIS AND INTRUSION DETECTION

BACKGROUND

Post mortem analysis, also known as root-cause analysis, is the process by which an administrator or a security analyst determines the steps that led to a security breach in an enterprise. The goal is to understand the incident so that similar incidents can be detected and prevented in the future. This type of analysis requires access to detailed data that is relevant to the incident under investigation. However, it is often infeasible to collect all data at all times. Thus, today's enterprise security products typically collect only a subset of the available data in the enterprise. Such products generally collect data based on a static policy defined by the administrator or analyst. Consequently, the level of details that are collected is generally defined by the capacity of the collection system and not necessarily by the relevance of the data or the data source. Therefore, in many cases, the security analyst ends up with a huge amount of data, most of which is almost completely irrelevant.

This Background is provided to introduce a brief context for the Summary and Detailed Description that follows. This Background is not intended to be an aid in determining the scope of the claimed subject matter nor be viewed as limiting the claimed subject matter to implementations that solve any or all of the disadvantages or problems presented above.

SUMMARY

An enterprise-wide sharing arrangement called "ESAS—Enterprise Security Assessment Sharing" is provided in which a semantic abstraction, called a security assessment, is created to enable sharing of security-related information between different security products, called endpoints, in an enterprise security environment. A security assessment is defined as a tentative assignment by an endpoint of broader contextual meaning to information (i.e., data in some context) that is collected about an object of interest in the environment such as a computer, user, service (e.g., a website), data, or the enterprise as whole. The security assessment utilizes a concise vocabulary for an endpoint to declare that an object in the environment falls into a particular assessment category such as "compromised" or "under attack" along with the severity (e.g., low, medium, high, critical) of the detected incident.

A security assessment is tentative because it is subject to some uncertainty and is valid for a limited period of time. The tentative nature of a security assessment is reflected in two of its components: a fidelity field which expresses the level of confidence the endpoint has its assignment of contextual meaning, and a time-to-live ("TTL") field which reflects the endpoint's estimate of the time period for which the security assessment is expected to be valid. Thus, for example, a security assessment may be used by an endpoint to declare, in light of that endpoint's current understanding of security incidents, that a particular machine is compromised, with a critical level of severity, with medium fidelity, and having a TTL of 30 minutes. A variety of types of security assessments may be used in any given enterprise security environment having varying combinations of assessment categories and severities.

In an illustrative example, the present ESAS arrangement enables endpoints to be configured to adaptively switch from their normal data collection mode to a long-term, detailed data collection (i.e., audit) mode where advanced analyses may be applied to the collected detailed data. Such adaptive data collection and analysis is triggered at an endpoint upon the receipt of a security assessment of a particular type (i.e., pertaining to an object and/or assessment category that is of interest to the endpoint). For example, a received low fidelity security assessment about an object can trigger a revision in a host's audit policy to thereby increase the data collected about the object. Advanced analyses or processes may also be applied to the larger set of detailed data that is adaptively collected about that specific object in response to the received assessment.

In another illustrative example, a specialized endpoint called an ESAS central server is coupled to the security assessment channel that performs as a centralized audit point by subscribing to all security assessments, logging the security assessments, and also logging the local actions taken by endpoints in response to security incidents in the environment. The ESAS central server is arranged to perform various analyses and processes on historical security assessments (i.e., those in which the TTL has expired) in order to enhance the ability to detect potential security incidents.

A cyclic memory store is optionally used in various locations within the environment to collect recent detailed data (i.e., detailed data collected over a short-term) about all objects in a monitored system. The recent detailed data may be persisted with the detailed data collected when an endpoint is adaptively switched to the long-term detailed data collection mode. This methodology enables detailed data about the object of interest to be made available for review by a security analyst for events that occurred both before and after the security assessment which triggered the adaptive collection was received.

The present ESAS sharing arrangement provides a number of advantages. By employing a security assessment having a concise vocabulary, overall data complexity in the enterprise is drastically reduced and only meaningful information is shared between endpoints. Use of the security assessment also eliminates the need to collect very large amounts of raw data in a central storage location, and thereby enables highly scalable enterprise security solutions to be built on a very cost effective basis. The adaptive data collection triggers an endpoint to collect more data, but such data collection is both effective and resource-efficient because the endpoint is only collecting more data about a specific object. In addition, the analytical techniques or processes may be applied to the larger set of detailed data which would be prohibitive if applied to all the data about all the objects in the environment. The adaptive switch to long-term, detailed data collection and/or application of advanced analyses modes further advantageously enables a comprehensive amount of detailed and relevant data about an object of interest in the environment to be presented to a security analyst for further investigation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Analysis of current enterprise security solutions indicates that there are still significant opportunities for addressing customer needs. For example, each separate security product tends to have high rates of false positive and false negative detection of security incidents such as those produced through actions of malware or malicious users. Such low fidelity detection occurs because data from a single type of source (i.e., a subset of the enterprise-wide data) does not normally provide the context needed to make an accurate assessment of the security incident.

The use of automatic actions or responses is very infrequent as a result of the low fidelity detection since confidence in the validity of the detected incident is low. In addition, the typical response to a detected incident tends to be very harsh, for example, a user or machine may be disconnected from the network. Since such harsh actions generally impose significant costs to business activity in the enterprise, automation of such actions based on low fidelity detection is not generally performed.

Upon detection of an incident of interest, current security products typically perform investigation to determine the validity of the detection (i.e., whether the incident is true or false) and what action to take in response. Significant resources are expended on investigation to review the detailed data that is collected which may be relevant to the detected incident. Because it is not feasible to collect all data at all times, a security product collects only a subset of the available data through application of policies defined by an administrator. Such policies are often static and are commonly defined based on the storage capacity of the collection system, and not necessarily by the relevance of the incident data or the data source.

When an incident is detected, application of the policies typically results in a review of the data which triggered the detection. When this data is deemed insufficient to generate a high fidelity response, typically even more data is collected.

For example, all of the data traffic into and out of a suspected compromised machine may be monitored. In many cases, a large amount of data is collected but is never used and has statistical significance only as noise. Consequently, many present security products collect an often overwhelming amount of noise, but not enough relevant data is collected.

Figure 1:
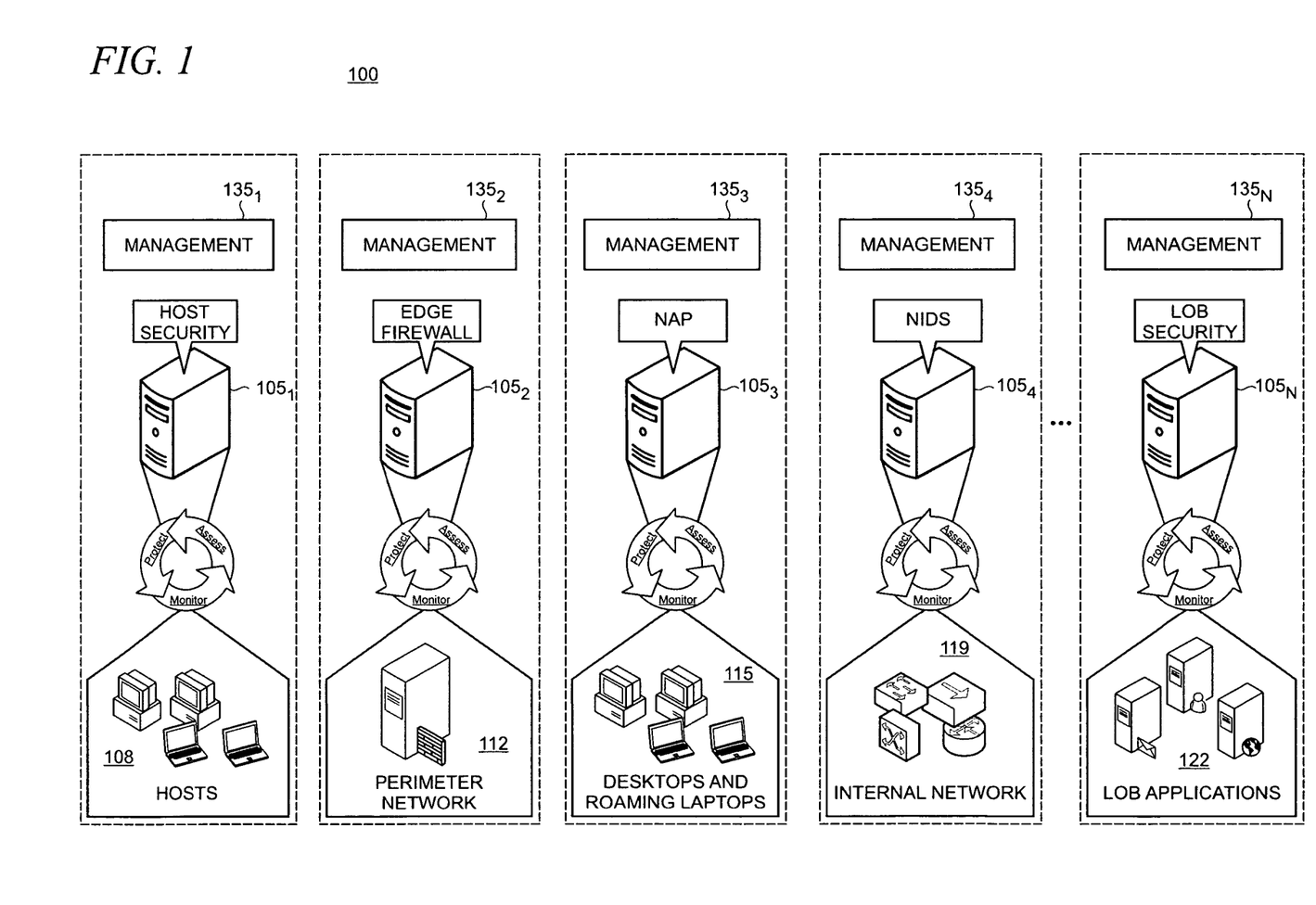
FIG. 1 shows an illustrative enterprise security environment in which the present enterprise security assessment sharing may be implemented.

Turning now to the figures where like reference numerals indicate like elements, FIG. 1 shows an illustrative enterprise security environment 100 in which a variety of security products 105—1, 2 . . . N, called endpoints, are deployed. It is emphasized that the number and type of endpoints 105 shown in FIG. 1 are merely illustrative and the specific number of endpoints can be scaled up or down, and different types of security products/endpoints can be utilized, depending on the requirements of a specific application of enterprise security assessment sharing. For example, in addition to those shown in FIG. 1 and described below, web application protection products, SEM/SIM (Security Event Management/Security Incident Management) products, operational heath monitoring and configuration management products (e.g., Microsoft Windows® Software Update Services, Microsoft Operations Manager), or identity management products (e.g., Microsoft Active Directory) are also usable in some applications.

In enterprise security environment 100, a host security endpoint $105_1$ is deployed to protect, assess, and monitor a plurality of host computers 108 in the enterprise 100. A commercial example of the host security endpoint $105_1$ is Microsoft Forefront Client Security® which provides unified malware protection for the enterprise's desktops, laptops, and server operating systems.

An edge firewall $105_2$ is a security product that is arranged to protect the enterprise environment 100 from Internet-based threats while providing users with remote access to applications and data through a perimeter network 112. Edge firewall $105_2$ may be embodied by, for example, a Microsoft Internet Security and Acceleration® ("ISA") server.

A NAP security endpoint $105_3$ performs computer health policy validation by ensuring ongoing compliance with health policies defined by an administrator. Typically, access is restricted for computers (e.g., desktops and roaming laptops 115) monitored by the NAP security endpoint $105_3$ that do not comply with system health requirements.

A NIDS security endpoint $105_4$ analyzes traffic inside the enterprise 100 over an internal network 119. The NIDS security endpoint $105_4$ operates to detect malicious activity such as denial of service attacks port scans by monitoring network traffic on the internal network 119.

A line-of-business security endpoint $105_N$ protects various line-of-business applications 122. Line-of-business applications 122 include, for example, an e-mail application such as Microsoft Exchange® that is used in the enterprise 100. Security endpoint $105_N$ typically monitors e-mail to provide anti-virus and anti-spam protection.

Each of the security endpoints 105 in the enterprise 100 are normally arranged as individual islands, as indicated by the dashed rectangles in FIG. 1. Accordingly, each security endpoint 105 is arranged for monitoring a subset of the available data pertaining to objects in the enterprise 100 and for performing localized actions in response to a detected incident. In addition, each endpoint typically includes a local management function 135—1, 2 . . . N. As noted above, the individual local management functions are not generally integrated to provide a single point of management.

Figure 2:
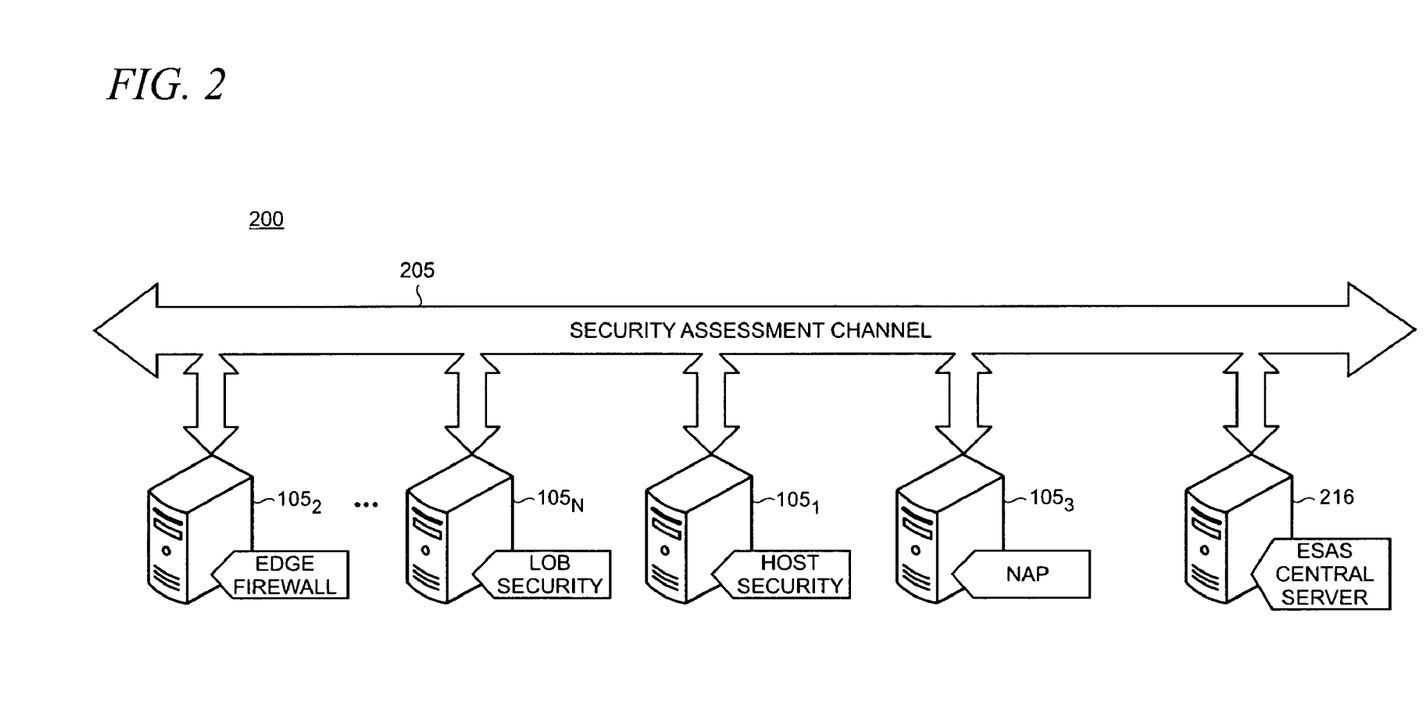
FIG. 2 shows an illustrative enterprise security assessment sharing arrangement in which a channel is provided to enable a security assessment to be shared among multiple endpoints.

FIG. 2 shows an illustrative ESAS arrangement 200 in which a channel 205 is provided to enable a semantic abstraction called a "security assessment" to be shared among multiple endpoints using a language/protocol that is commonly-utilized at each endpoint. The security assessment channel 205 facilitates a publish/subscribe model used by the endpoints for connecting the sources of security assessments (publishers) to the consumers of the security assessments (subscribers). As shown, both the publishers and subscribers on the security assessment channel 205 are endpoints 105.

The endpoints are enabled with functionality to publish security assessments onto the security assessment channel 205, as well as subscribe to a subset of available security assessments published by other endpoints. Active security assessments in the environment function to provide a security context that gives these ESAS-enabled endpoints with a new way to look at their own locally-available information. Active security assessments are those having a time-to-live ("TTL") field which indicates they are still valid, as described in more detail below.

The security context enables the ESAS-enabled endpoint to combine or correlate evidence from security assessments received from a variety of different sources, and across object types, in order to significantly enhance the quality of its detection of potential security incidents. The ESAS-enabled endpoint then makes a decision as to what local action or response is appropriate using the security context in combination with its own security expertise (i.e., correlation rules), and locally-available data. Such decision-making is both efficient and cost-effective because the security context enables distributed processing of enterprise-wide information in the form of security assessments without the burden of sharing huge amounts of raw data throughout the enterprise (most of which is completely irrelevant due to the lack of any context). ESAS-enabled endpoints are arranged to roll-back the local action upon expiration of the security assessment that prompted the local action (i.e., when the security assessment exceeds the time-to-live specified in the TTL field).

The endpoints 105 are isolated from the mechanics of the actual transport and management of the publish/subscribe model through a semantic abstraction layer that is arranged to simplify interactions with the security assessment channel 205. The abstraction layer comprises tables describing the security assessment types to which the endpoints subscribe, and tables describing the security assessment types that endpoints publish (as described below, not all endpoints generally subscribe to all security assessment types). In addition, the abstraction layer provides an API (application programming interface) for reading received security assessments, and an API for generating security assessments.

A specialized endpoint, ESAS central server 216, is coupled to the security assessment channel 205 and performs as a centralized audit point for the ESAS arrangement 200. Accordingly, the ESAS central server 216 subscribes to all security assessments and permanently logs them. ESAS central server 216 also receives and logs messages from the endpoints that indicate the local actions that are taken by an endpoint. The ESAS central server 216 thus provides administrators with security assessment monitoring functionality that gives a comprehensive view of the history and current status of the enterprise as a whole, and each ESAS-enabled endpoint.

Figure 3:
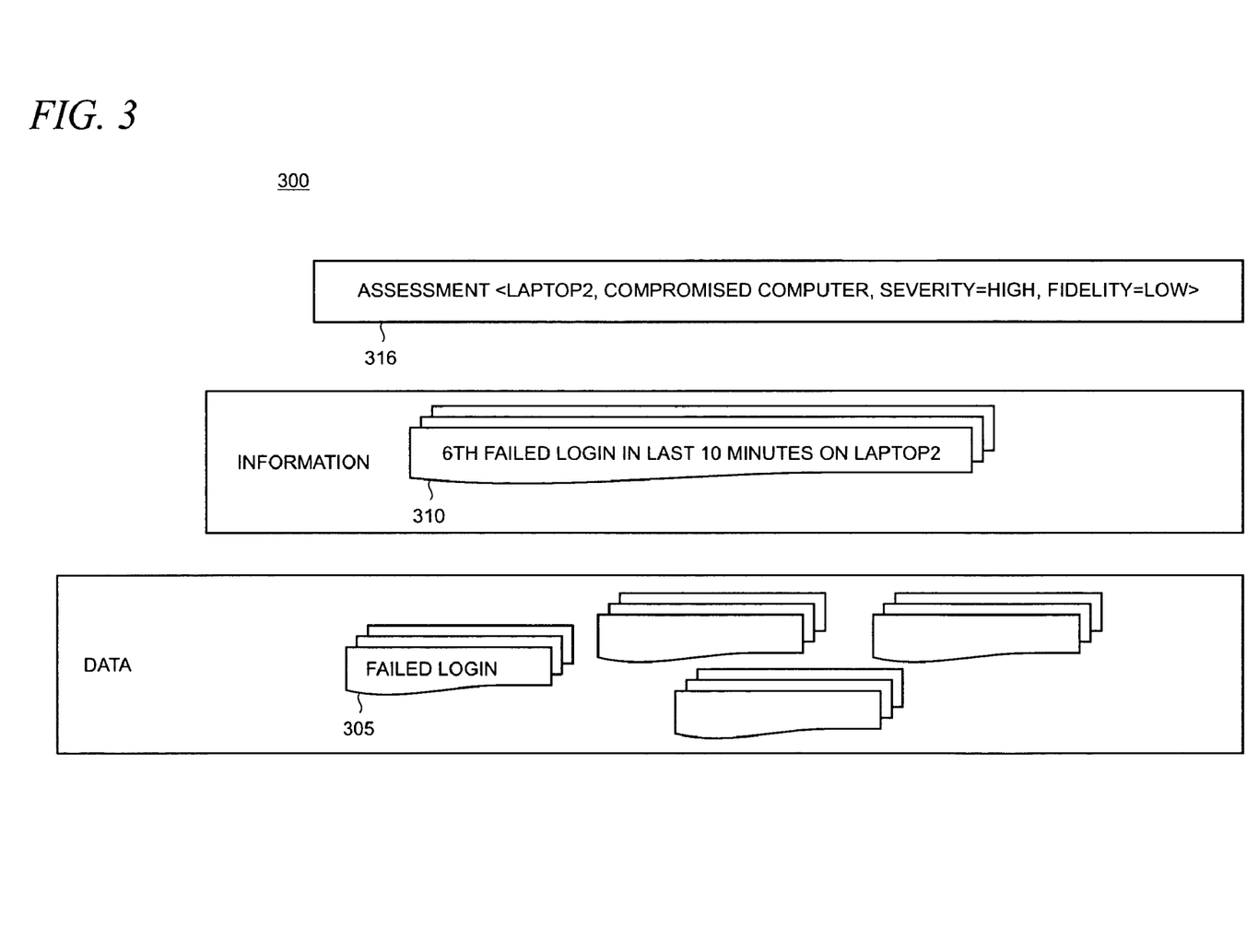
FIG. 3 shows an illustrative terminology hierarchy that underlies a security assessment.

FIG. 3 shows an illustrative terminology hierarchy 300 that underlies a security assessment. A security assessment is defined as a tentative assignment of security meaning, or category, to information. Information, as used here, is defined as data with some context. Data is defined as discrete items devoid of context. These definitions may be further described by way of an example. As shown in FIG. 3, a piece of data 305 is an event in an event log such as a failed login. Information 310 is data provided with context which, in this example, is that the failed login was the sixth such failure within 10 minutes on the same machine, a laptop named Laptop2. The security assessment 316, in this example, indicates that Laptop2 is categorized in a particular way, namely that it is assessed with a category of "Compromised," with high "severity," and where such assessment has low "fidelity" (these terms are defined and discussed below in more detail).

A security assessment may be performed on any object of interest in an enterprise security environment, such as a user or a device. In this illustrative example, assessments include four main object types: 1) Host—assessments about computers in an enterprise; 2) User—assessments about users or accounts in enterprise; 3) Service—assessments about a service provided to the enterprise such as a URL (Uniform Resource Locator) of a web site that has a reputation as being malicious; 4) Enterprise—assessments about the enterprise as a whole or a well-defined subset of the enterprise such as a department, subnet, site, or branch; and 5) Data—assessments about business-related data (e.g., as found in documents, e-mail, business data in a database etc.) that is present or accessed by objects in the enterprise.

It is emphasized that these object types are merely illustrative, and other object types may be used as required by specific scenarios. In most applications of enterprise security assessment sharing, endpoints only publish, and subscribe to, a subset of all of the available security assessment types since particular endpoints are generally going to have interest in particular objects in the enterprise environment. In addition, while some endpoints will be both publishers and subscribers, there is no requirement for every endpoint to support both functionalities. For these reasons, the publish/subscribe model used herein is said to be loosely-coupled.

Table 1 below shows an illustrative set of assessment categories, and their mapping to specific object types, that may be contained in a typical security assessment:

TABLE 1

| Object Type | Assessment category | Description |
|---|---|---|
| Host | Vulnerable machine | Machine had vulnerable configuration or is missing some patches. |
| | Compromised machine | An endpoint detected some evidence that the machine might be compromised by a malicious software/user. |
| | Machine under attack | An attack attempt was detected without an evidence for success |
| | Machine of interest | An endpoint has a general suspicion about a machine without the ability to pin point what is wrong. |
| User | Compromised user | An endpoint detects some evidence that the user/account might be compromised. |
| | User under attack | An attack attempt was detected without an evidence for success |
| | Malicious user | An endpoint or an administrator detects that a user is a malicious one and actively (i.e., on purpose) performs illegal actions. |
| | User of interest | An endpoint has a general suspicion about a user/account without the ability to pin point what is wrong. |
| Enterprise | Enterprise under attack | An endpoint detects that an enterprise is under attack without evidence that a significant part of the enterprise is compromised. |
| | Compromised enterprise | An endpoint detects that significant part of the enterprise is compromised (machines/users). |

TABLE 1-continued

| Object Type | Assessment category | Description |
|---|---|---|
| Service (e.g., a web site) | Malicious | A URL (Uniform Resource Locator) has a malicious reputation. |
| Data | Compromised | An endpoint detects some evidence that some business-related data in the enterprise is compromised. |
|  | Corrupted | An endpoint detects some evidence that some business-related data in the enterprise is corrupted. |

In the present illustrative ESAS arrangement, four levels of severity are typically utilized: low, medium, high, and critical. Three levels of fidelity are typically utilized: low medium, and high. Note that the number of levels for both severity and fidelity can be arranged to be different depending on the assessment category. For example, it is possible to use the three severity levels for the assessment category of "vulnerable machine" while using four severity levels for the assessment category of "compromised machine." The particular choice of number of levels to be utilized will depend on the requirements of a specific application of the present enterprise security assessment sharing.

A security assessment uses information that is available at the time the assessment is made and relies on the particular security expertise and knowledge that is resident in the endpoint that produces it. A security assessment is tentative because confidence in any particular event can never be absolute, and also because the assessment is temporary in nature as it relies on information that is present at the time it was produced. At some future time, other information will be available, so the security assessment may change.

The tentative nature of a security assessment is reflected in two fields included in each assessment—fidelity and time-to-live ("TTL"). The fidelity field provides a way for endpoints to express their confidence level in an assignment of a broader contextual meaning to information being analyzed. The TTL field enables endpoints to reflect the best estimate of the time period for which the security assessment is expected to be valid. Or alternatively, the TTL field provides the best estimate for a future security assessment update. When a TTL expires, an endpoint that takes actions based on a security assessment to which it subscribes is expected to roll-back such actions when the TTL of that assessment expires. Thus, the TTL provides a safety valve functionality to prevent a user or a machine from getting inappropriately trapped with restricted access due to a false positive, or the loss of a message somewhere in the enterprise. However, if such restricted access is indeed appropriate, then either a new security assessment may be generated to continue the restriction, or the TTL extended.

Figure 4:
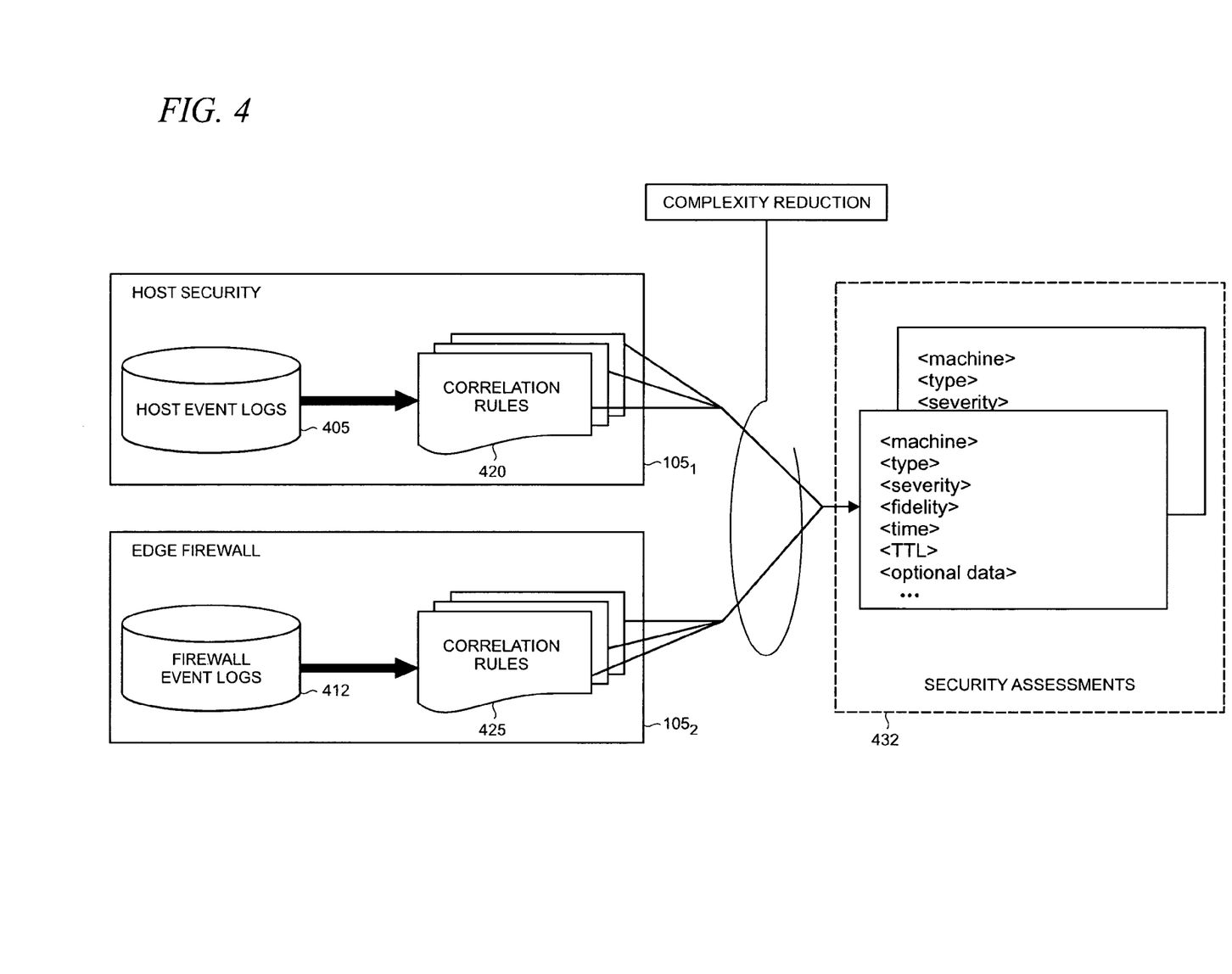
FIG. 4 shows two illustrative endpoints and the complexity reduction enabled by the utilization of the present security assessment arrangement.

The security assessment is designed to enable precise semantics (i.e., the meaning imparted by the categorization used in the security assessment) using a compact vocabulary. As shown in FIG. 4, two of the endpoints 105 in the enterprise log data about events that occur in their respective areas of interest. The host event logs 405 and firewall event logs 412 thus contain very large amounts of data. Typically, the data is processed in the respective endpoints using correlation rules 420 and 425 in order to identify events of interest. The correlation rules, which are often numerous, define the localized sponsors or actions taken responsibly to a detected event.

By comparison, the security assessments, indicated by reference numeral 432, contain only a relatively small amount of data. As security assessments are utilized to assign broad context to information, they provide answers to the questions: Who created the assessment? When? Why? For how long? And, on which object does the assessment apply? Thus, in order to make use of a security assessment, an endpoint need only understand the few assessment types of interest as compared with the unbounded number of information messages that result from application of the correlation rules. Accordingly, the complexity of the data collected by each endpoint is reduced by mapping information into one or more of the assessment types. Using security assessments thus enables relevant information to be provided to subscribing endpoints without requiring that large amounts of data or information be shared across the enterprise.

Table 2 below provides an illustrative set of fields that may be included in a typical security assessment.

| Field | Description |
|---|---|
| Incident ID | A unique identifier that represents the incident for which a security assessment was created. Since there may be several assessments that are tied to the same incident (e.g., detection, response, approval, cancellation), this field also uses a correlation value |
| Instance ID | A unique identifier that represents a single security assessment message |
| Source | Endpoint type (e.g., host security, edge firewall, NAP, NIDS, etc.) and unique endpoint ID |
| Relates To | If an assessment was created responsively to other security assessments then this field will contain the list of all the assessment's incident IDs |
| Object type | host, user, reputation, enterprise or other object type |
| Object ID | An identifier for the object. Endpoints often describe the same object in different ways. For example, a host can be identified by its FQDN (Fully Qualified Domain Name), IP (Internet Protocol), MAC (Media Access Control), or SMTP (Simple Mail Transfer Protocol) addresses, etc. |
| Category | Compromised, Vulnerable, Under Attack etc. |
| Operation | Published (upon detection), response, approval, cancellation, etc. |
| Severity | Severity of the incident |
| Fidelity | Confidence of the endpoint in its detection of an incident |
| Creation time | GMT (Greenwich Mean Time) and local time |
| TTL | Time-to-Live in minutes |
| Description | A human-readable format that explains why the assessment was created |
| Data | Private information about why the assessment was created. Other endpoints may use this data for additional correlations |
| Response | (Optional) a compound node that contains the set of responses that were taken by the endpoint |
| By | (Optional) in case the assessment was approved/canceled/created by a user, this field will contain the name of the user |
| Version | Schema version of the assessment |

Using the fields in Table 2, a security assessment is capable of expressing the following events:

1. Detection. An endpoint executes some analysis to deduce that some abnormal behavior has occurred (compromised machine, vulnerable machine, compromised user, etc.);
2. Response. Endpoints take actions as a result of security assessments. An endpoint should notify the system (specifically, the ESAS central server 216 in FIG. 2) when actions are taken. Responses may include, for example, blocking traffic, triggering a scan, resetting a password, collecting more data about a machine, and similar actions. Note that some responses such as resetting a password or triggering a scan are intermittent, while other responses are persistent and need to be rolled back in order to be canceled;

3. Assessment approval. An administrator can approve assessments manually using an interface to the ESAS central server 216. Endpoints shall be notified upon such approval so they will perform the "required manual approval" responses;
4. Cancellation. An administrator or an endpoint can cancel an existing security assessment;
5. Response roll-back. An endpoint notifies the system (ESAS central server 216 in FIG. 2) that it rolled-back all responses/actions that were taken due to a specific assessment;
6. Health information assessments such as connectivity verifiers, latency checking, and error information;
7. Request for investigation data. This is a request from an endpoint to another endpoint to send all its data about an object collected in a given time period; and
8. Request for investigation data completed. This is a method for the endpoint to acknowledge that it performed the request. The response to the request is sent after the data was stored/sent.

In this illustrative example of enterprise security assessment sharing, each endpoint is arranged to perform at least some of the tasks noted below. In some arrangements, each endpoint is enhanced with additional functionality as required to perform such tasks through use of a discrete ESAS agent. Alternatively, the enhanced functionality may be more tightly integrated into the core functionality provided by the endpoint, and a separate or discrete agent may not necessarily be embodied in the endpoint. Such tasks include:

1. Generating new security assessments based on the locally available information about the monitored system and the security context;
2. Subscribing to a subset of available security assessments from other endpoints;
3. Processing incoming security assessments to thereby influence the security context. The processing can result in the generation of new security assessments;
4. Taking local actions according to response policies;
5. Rolling back (self-recovery) a local action when an assessment that caused it expires (i.e., expiration of the associated TTL).

Figure 5:
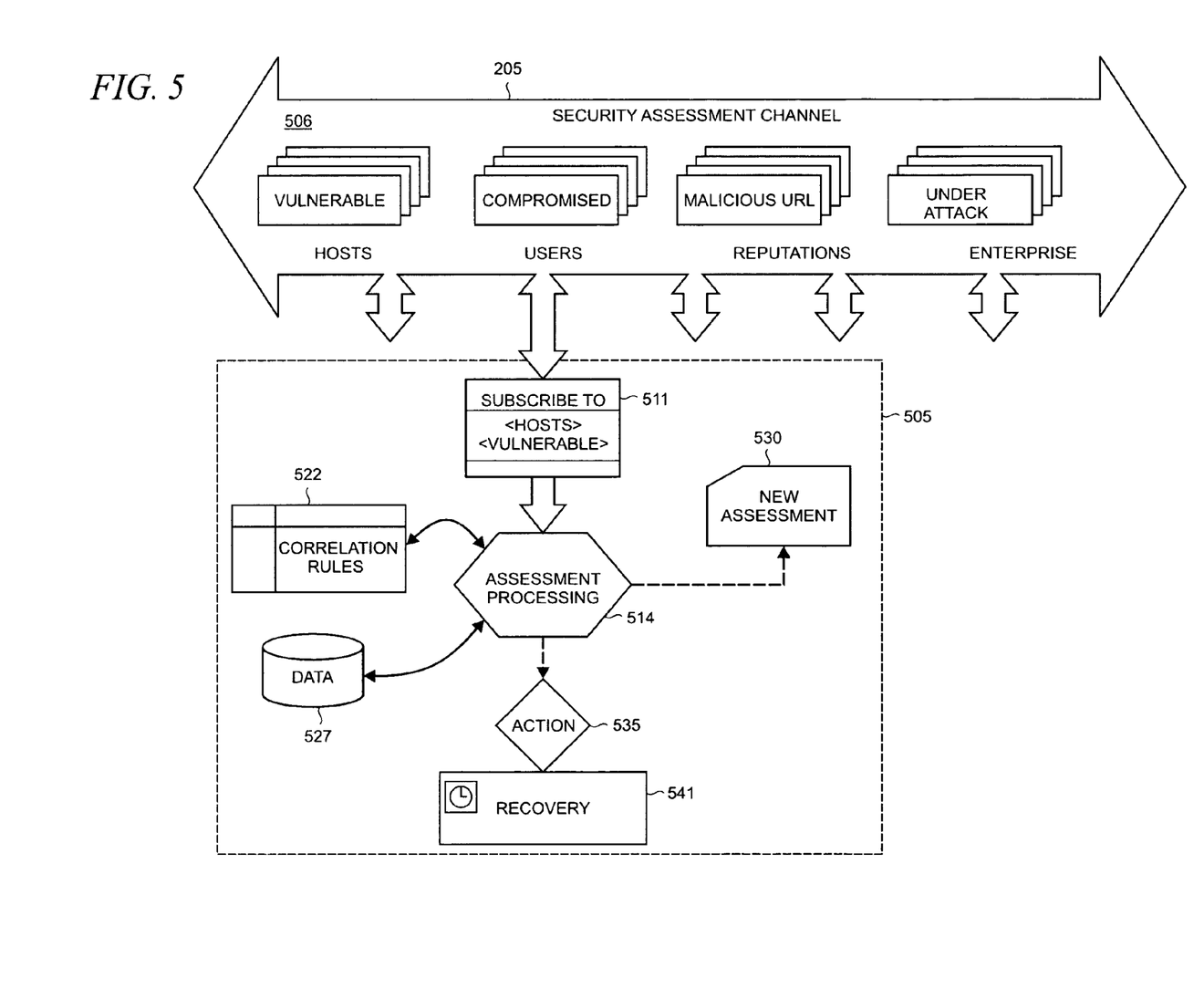
FIG. 5 shows an illustrative example of functionality disposed in an endpoint that enables sharing of security assessments.

FIG. 5 shows an illustrative example of an ESAS agent 505 disposed in an endpoint which subscribes to a subset of available assessments from other endpoints 105—1, 2 . . . N (FIG. 1) over the security assessment channel 205. As noted above, the functionality provided by ESAS agent 505 may alternatively be directly integrated with the core functionality of the endpoint.

A plurality of security assessments 506 are available for each of the security assessment types (i.e., hosts, users, reputations, and enterprise). As indicated by reference numeral 511, in this illustrative example, ESAS agent 505 subscribes to security assessments having a "Host" object type with an assessment category of "Vulnerable." It is emphasized that a particular combination of object types and assessment categories that is of interest can be different for different endpoints. Again, using the loosely coupled publish/subscribe model there is no requirement that every endpoint subscribes to every security assessment.

At process block 514, the endpoint processes the received security assessment using correlation rules 522 and locally-available data 527 that may be of some relevance. The outputs of such assessment process include the generation of the new assessment 530 and/or an invocation of a local action 535. As noted above, such local action is subject to roll-back 541 (i.e., self-recovery) when the received assessment expires according to the TTL field contained therein.

ESAS agent 505 interprets security assessments according to the following rules:

1. In generating a security assessment about a particular object, an endpoint can take into account any combination of the following:
   a) All of the locally-available information about the object or any other objects the endpoint monitors;
   b) All the currently active security assessments (i.e., those having an unexpired TTL) the endpoint has received;
   c) All the local actions the endpoint has taken in the past.
2. All of the endpoints in the present enterprise security assessment sharing arrangement comply with the principle that all of the sets of locally-available information in the endpoints are mutually exclusive. That is the present arrangement has no more than one endpoint processing a particular piece of local information.
3. Security assessments are typically interpreted as describing an endpoint's assessment about the current and future security state of an object.

It is important to note that the Rule 2 refers to the exclusivity of information and not data as these terms were defined above. Two endpoints can process the same or overlapping data sources provided that the information they extract from the data and later use to generate assessments is exclusive.

To illustrate the implications of Rule 3 consider the following example where a scheduled antivirus scan of a machine detects and removes a piece of known malware. Based on this detection, other locally available information, a received currently active assessment, and on the endpoint's embedded knowledge about current security incidents, the endpoint may conclude one of the following: 1) a machine was infected in the past, but is now clean and does not pose any additional future security risk; 2) The machine was infected and, while the particular malware was removed, it is possible or likely that it still poses a security risk. According to Rule 3, an endpoint should generate a security assessment about the machine in the latter case and not generate one in the former.

Figure 6:
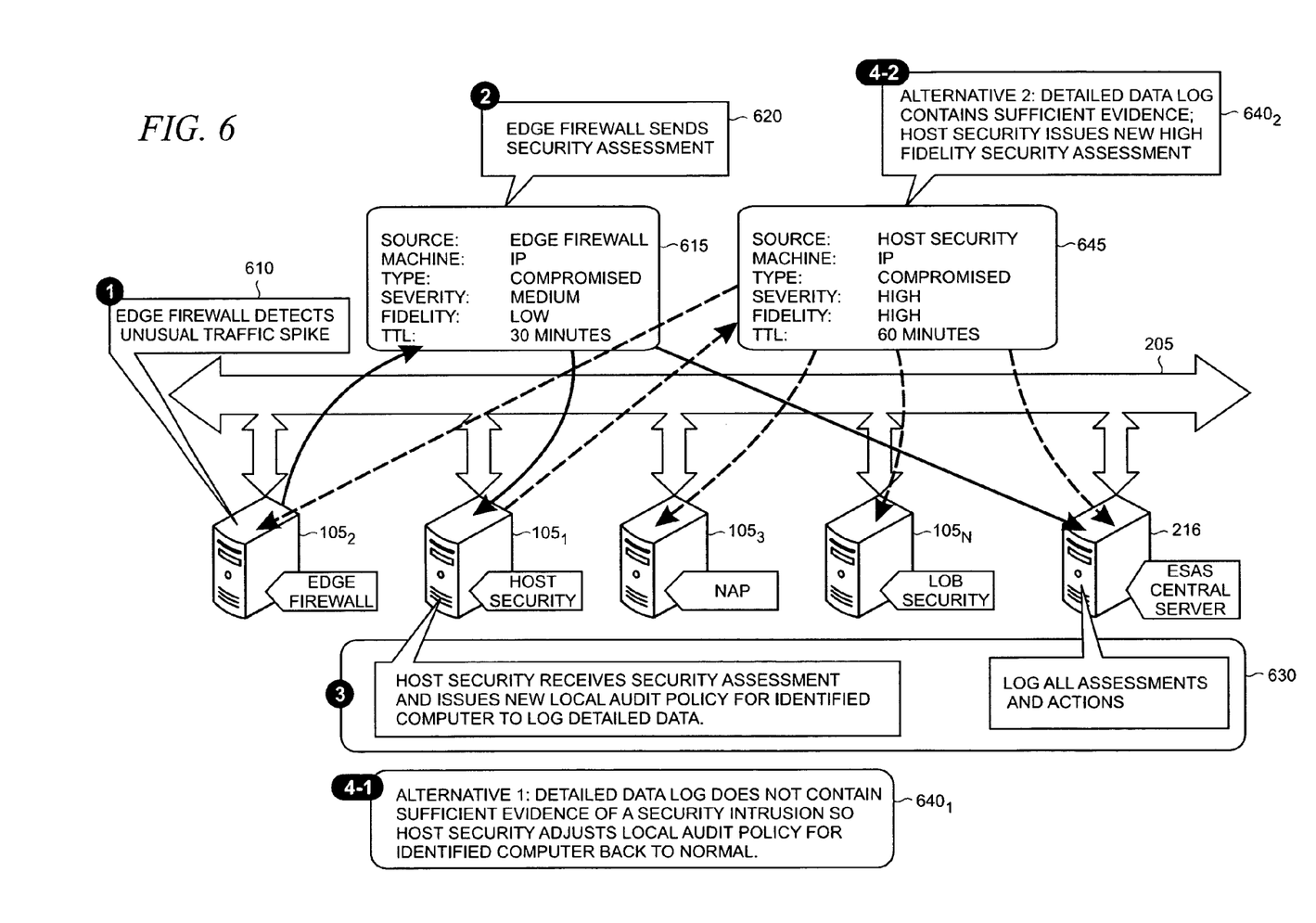
FIG. 6 is a diagram of a first illustrative scenario that demonstrates how a low fidelity security assessment generated by an endpoint triggers adaptive data collection in which long-term, detailed data collection and processing is performed by another endpoint.

FIG. 6 is a diagram of a first illustrative scenario in which a plurality of ESAS-enabled endpoints are coupled to the security assessment channel 205 and a low fidelity security assessment generated by one endpoint triggers adaptive data collection in which long-term, detailed data collection and processing is performed by another endpoint. This illustrative scenario is described in four stages.

As indicated by reference numeral 610, the edge firewall 105$_2$ first detects a short-term spike in unusual traffic which may indicate a potentially compromised client. Second, the edge firewall 105$_2$ sends a security assessment 615 that indicates the particular client is "compromised" with medium severity and low fidelity, as indicated by reference numeral 620, over the security channel 205 to subscribing endpoints.

Third, the subscribing endpoints—host security 105*l* and the ESAS central server 216—upon receiving the security assessment, typically apply a set of response policies to trigger an appropriate action. As collectively indicated by reference numeral 630 in FIG. 6, the host security endpoint 105$_1$ issues a new local audit policy while the ESAS central server 216 logs the security assessment and any local actions taken by endpoints in the enterprise.

Host security endpoint 105$_1$, in this illustrative example, is configured with a response policy that, responsively to the receipt of low or medium fidelity security assessment, increases the auditing of the object referenced in the security assessment (note that response policy configuration is described below in the text accompanying FIG. 8). That is, if host security endpoint 105$_1$ normally collects data associated with certain events from the host's event logs when it receives a low or medium fidelity security assessment about an object, it responds by taking a local action to collect detailed data about the object. The host security endpoint $105_1$ accomplishes this task through interaction with the host to change the audit policy in the host. Such audit policy instructs the host's operating system as to which events, and how many events to write into the event log.

Thus, in response to the received security assessment (in this case, either a low or medium fidelity assessment), the host can write more data to its event logs, and the host security endpoint $105_1$ can collect more data from the host's event logs. Such detailed logging and collection may be arranged to be performed on a long-term basis, if needed, as defined by an endpoint's response policy for that particular security assessment type. It is emphasized that such adaptive data collection—in which a short data segment as would typically support a low or medium fidelity assessment triggers a switch to a long-term detailed data collection mode in regard to an object of interest—may be arranged to be used with a variety of security assessment types having varying severity and fidelity according to the particular requirements of a specific application of security assessment sharing.

The fourth stage in the illustrative scenario shown in FIG. 6 includes two different alternatives. In the first alternative, indicated by reference numeral $640_1$, the host security endpoint $105_1$ applies an advanced analysis comprising an intrusion detection algorithm on the detailed data collected from the host. If the application of the algorithm results in an insufficient amount of evidence to support a conclusion that an incident occurred, then the host security endpoint $105_1$ may adjust the host's local audit policy back to its previous state so that events are logged at a normal level.

If however, the application of the algorithm results in a sufficient amount of evidence to support the conclusion that an incident occurred, then alternatively, the host security endpoint $105_1$ generates a new security assessment 645 having high fidelity as indicated by reference numeral $640_2$. The new security assessment 645 is shared among the subscribing endpoints as shown in FIG. 6.

Upon the expiration of the TTL in security assessment 645, the detailed data collection performed by the host is rolled-back to its previous level according to the normal audit policy. However, the collected detailed data is retained in accordance with a detailed data retention policy that may vary according to specific requirements.

The first illustrative scenario shown in FIG. 6 highlights the ability of the present ESAS arrangement to differentiate between data that is relevant to an object of interest in the environment and data that is just statistical noise. Accordingly, as described above, an endpoint may be arranged to collect more data, but such data collection is both effective and resource-efficient because the endpoint is only collecting more data about a specific object. In addition, as with the advanced intrusion detection algorithm described above, additional analytical techniques or processes may be applied to the larger set of detailed data which would be prohibitive if applied to all the data about all the objects in the environment.

Figure 7:
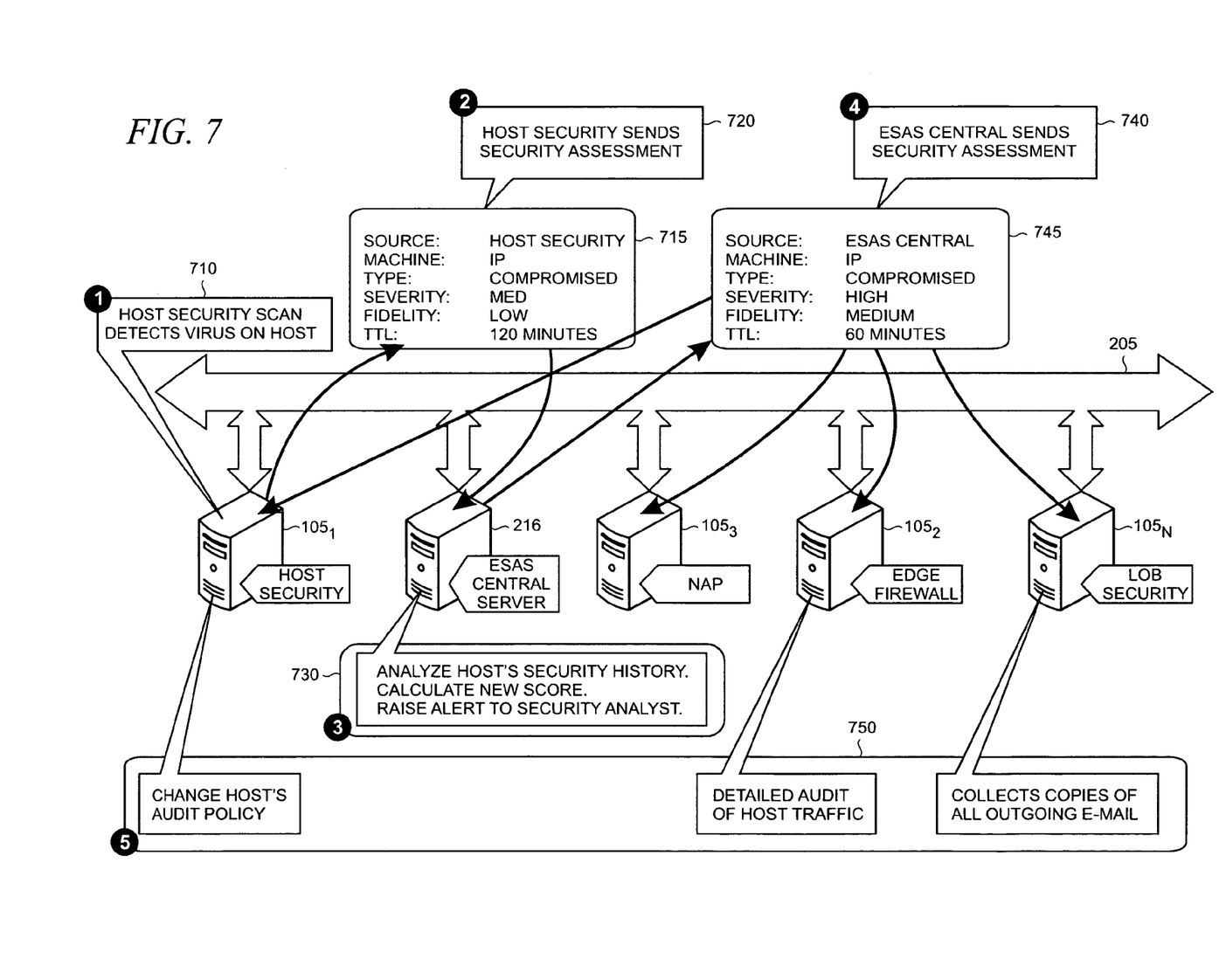
FIG. 7 is a diagram of a second illustrative scenario that demonstrates how analysis of historical security assessments by an endpoint triggers adaptive data collection at another endpoint.

FIG. 7 is a diagram of a second illustrative scenario that demonstrates how analysis of historical security assessments by the ESAS central server 216 may be used to trigger adaptive data collection at other endpoints in the environment. This illustrative scenario is described in five stages.

First, host security endpoint $105_1$ performs a scan on a host which detects a virus as indicated by reference numeral 710. After the virus is detected, it is cleaned from the host. Second, although the event of interest is not particularly severe given that the virus was cleaned from the host, the host security endpoint $105_1$ may nevertheless still generate a low fidelity assessment message 715 which indicates that the host machine is potentially compromised with medium severity, as indicated by reference numeral 720.

Security assessment 715 is shared across the ESAS channel 205 to the subscribing endpoints 105—2, 3, N and ESAS central server 216. ESAS central server 216, as noted above, subscribes to all security assessments that are generated in the environment. As a result, it maintains a history of all past (i.e., expired) security assessments from all of the endpoints. ESAS central server 216 is arranged, in this illustrative example, to perform a variety of analyses on the historical security assessment data in order to detect potential security incidents. For example, ESAS central server 216 may be configured with a particular set of rules that indicates that three low fidelity security assessments being generated about a particular host in the environment in a month do not present a risk. However, if that number of low fidelity assessments pertaining to the host (i.e., its "score") were to increase to five or 10, then it could indicate that the particular host is indeed compromised, despite the fact that at any individual moment in time there might only be a single low fidelity security assessment having applicability to the host.

At the third stage in the illustrative scenario shown in FIG. 7, as indicated by reference numeral 730, the ESAS central server 216 performs an analysis of the history of security assessments pertaining to the identified host and calculates a new score in light of the security assessment 715 received from the host security endpoint $105_1$ using its local rules. In this example, the host's score exceeds a pre-determined threshold and ESAS central server 216 raises an alert for a security analyst (e.g., administrator). At stage four, as indicated by reference numeral 740, responsively to its historical analysis, the ESAS central server 216 generates a new security assessment 745 indicating the host is "compromised" with high severity and medium fidelity.

In this example, at stage five, as indicated by reference numeral 750, responsively to the received security assessment 745 from the ESAS central server 216, each subscribing endpoint switches to an adaptive long-term data collection mode. The host security endpoint $105_1$ changes the affected host's local auditing policy in a similar manner as that described above. The edge firewall $105_2$ switches from writing normal networking flow summaries to its event log to performing a detailed audit of traffic to and from the identified host on a packet basis. The line-of-business security endpoint 105 also increases its auditing level by collecting copies of all outgoing e-mail generated by the identified host. The local actions described here are rolled-back to the previous state upon expiration of the TTL in the security assessment 745. However, the collected detailed data is retained in accordance with a detailed data retention policy that may vary according to specific requirements.

In both of the illustrative scenarios shown in FIGS. 6 and 7, the adaptive switch to long-term, detailed data collection and/or application of advanced analyses modes advantageously enables a comprehensive amount of detailed and relevant data about an object of interest in the environment to be presented to a security analyst for further investigation.

Figure 8:
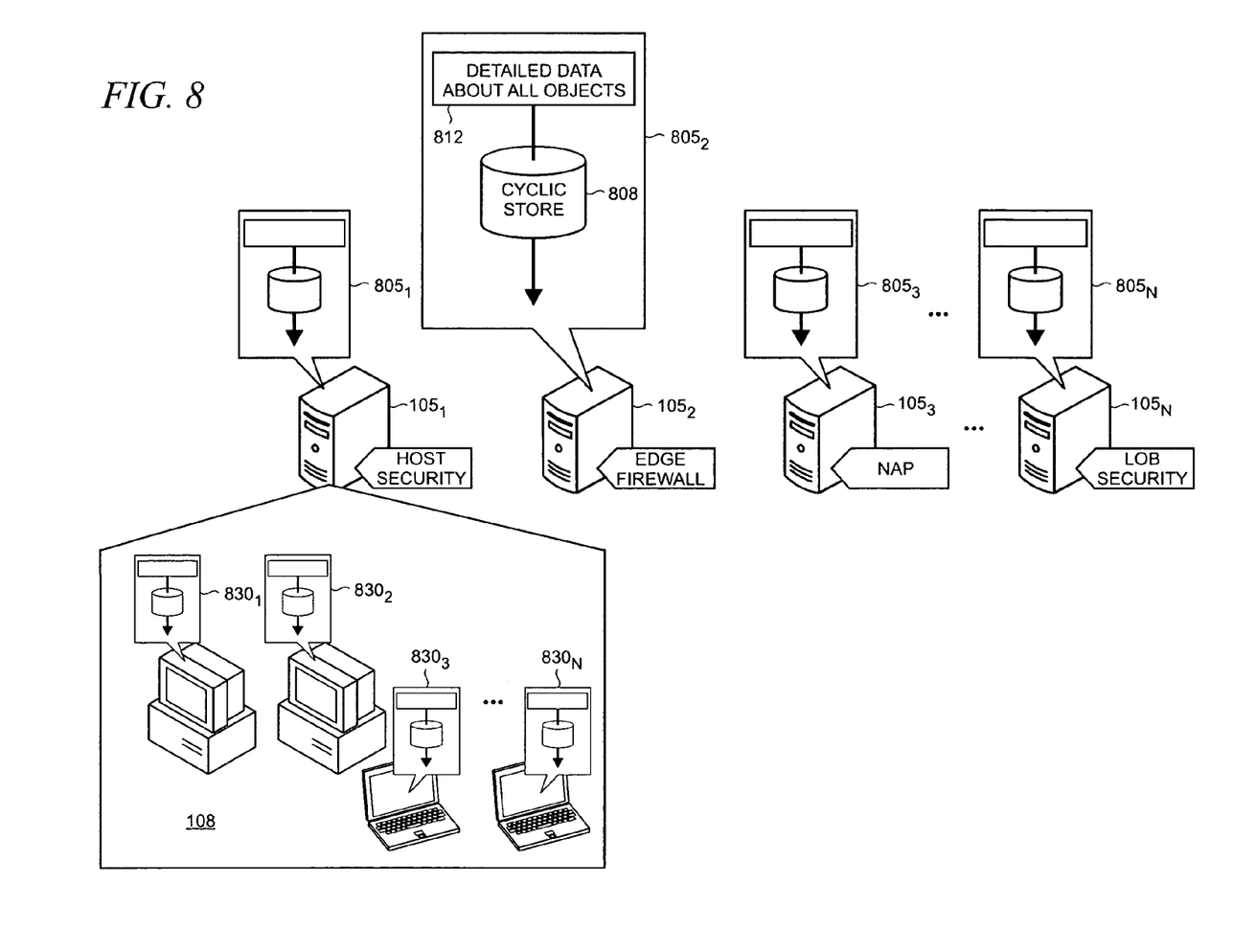
FIG. 8 shows an illustrative arrangement that is optionally used in which one or more cyclic memory stores collect recent detailed data about objects in an enterprise security environment.

FIG. 8 shows an illustrative arrangement that is optionally used in which one or more cyclic memory stores collect recent detailed data about objects in an enterprise security environment. As shown, a persistent memory 805—1, 2 . . . N is associated with endpoints 105. Not every endpoint 105 need necessarily include a persistent memory 805 for detailed data collection of recent events.

The persistent memory 805 includes a cyclic store 808 which is arranged to store detailed data 812 about all objects in the system being monitored by the particular endpoint. Cyclic store 808 is generally arranged as a relatively small memory that stores recent detailed data on a first-in, first-out basis. Thus, as security events occur in the monitored system they are collected in the cyclic store 808, held for a time interval determined by the size of the cyclic store, and then purged as more recent events are collected.

The persistent memory 805 enables detailed data from the cyclic store 808 to be retrieved and combined with detailed data collected when adaptive data collection is triggered, as described above in the text accompanying FIGS. 6 and 7, by the receipt of a security assessment (typically, a low or medium fidelity assessment). For example, if a particular object is identified in a security assessment, detailed data about that object is retrieved from the cyclic store 808 and combined with the detailed data that is collected during a long-term detailed audit that is set, for example, by a change in a host's audit policies. Advantageously then, detailed data about the object of interest is available for review by an analyst where such detailed data is associated with events that occurred both before and after the security assessment which triggered the adaptive collection was received.

In this illustrative example, the hosts 108 monitored by host security endpoint $105_1$ are optionally arranged with memories 830—1, 2 . . . N for storing recent security events about all objects that exist in each of the host's local environments. Typically, detailed data collected in the cyclic stores associated with the memories 830 is not also collected by host security endpoint $105_1$.

Figure 9:
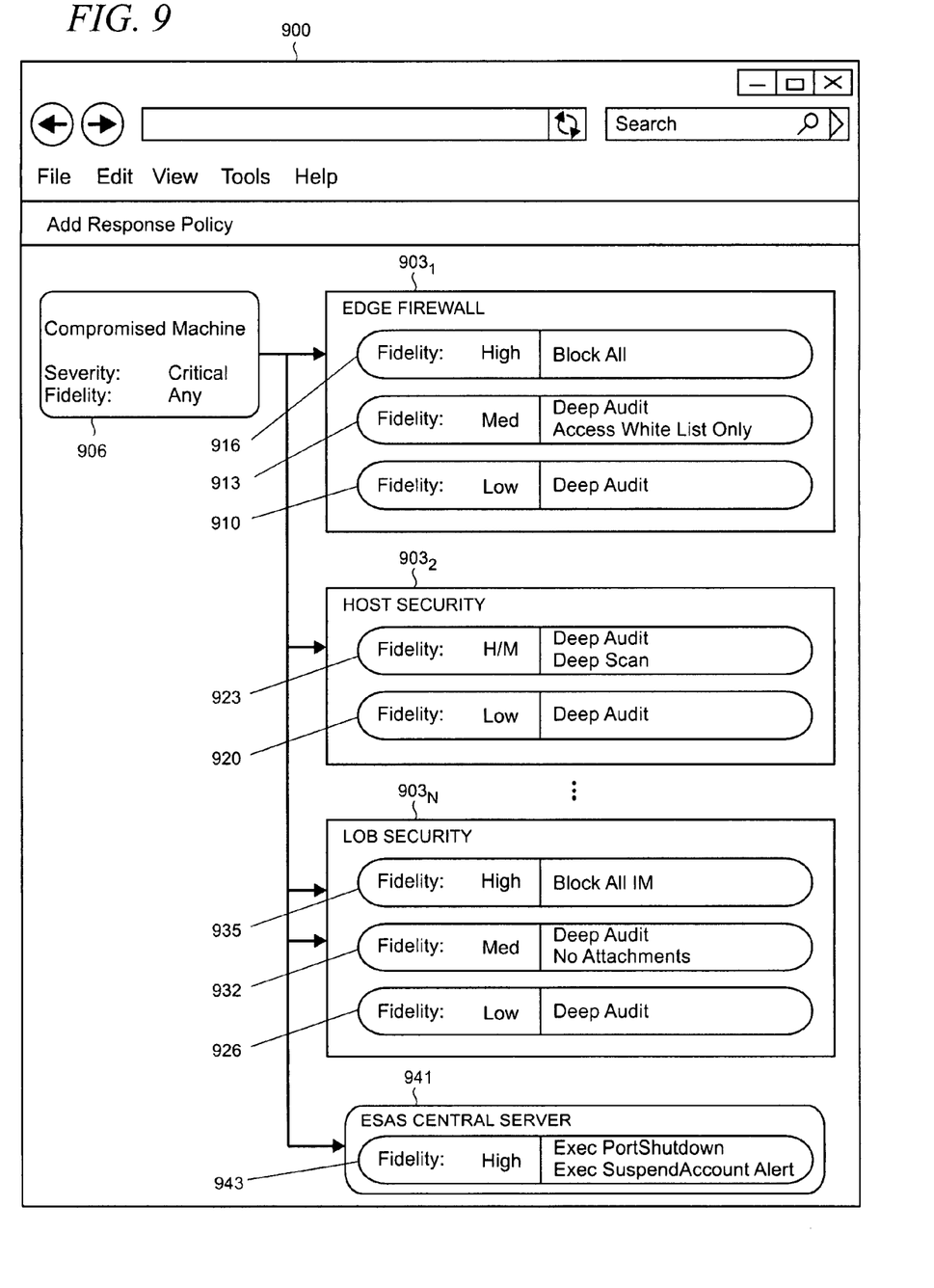
FIG. 9 shows an illustrative screen that is provided by a graphical user interface ("GUI") which enables a user, such as an administrator, to manage and define the response policies of ESAS-enabled endpoints in the enterprise.

FIG. 9 shows an illustrative screen 900 that is provided by a graphical user interface ("GUI") which enables a user, such as an administrator, to manage and define the response policies of endpoints in the enterprise 100 (FIG. 1). In some applications, the GUI is hosted on the ESAS central server 216 (FIG. 2). Advantageously, the semantic abstraction layer embodied by the security assessments enables enterprise-wide security policies to be established using a very compact and clear methodology. That is, response policies may be configured using a security assessment as a defined starting point without being concerned as to which endpoint in the enterprise created the security assessment, or how the endpoint came to the conclusion reflected in the security assessment. The security assessments, with their compact taxonomy, thus function as natural anchors to enterprise-wide security response policies. Without the present ESAS arrangement to streamline the configuration of response policies, a user would need to consider every event and/or alert that every endpoint could possibly generate, and then define what to do with each such event.

Screen 900 is an illustrative example showing the configuration of enterprise-wide response policies, using fields 903—1, 2 . . . N for a number of different endpoints, for the case of an assessment category of a compromised machine with critical severity, which defines a starting point (i.e., "anchor" point) for the response policy configuration as indicated by reference numeral 906. It is emphasized that other user interface screens would be utilized for other assessment categories, object types, severity levels, etc., so that the user is enabled to define response policies for the plurality of different starting points that are likely to be used in a particular enterprise security environment. The response policies, in this particular example, are set depending upon the fidelity of a particular security assessment for a set severity level of "Critical." Fields 903 include a number of respective subfields that are arranged to reflect user-defined input, using for example, text entry boxes, drop-down menus, and the like that are employed in typical GUIs.

As indicated in subfield 910, for a security assessment indicating a compromised machine with critical severity, the edge firewall $105_2$ (FIG. 1) is configured to increase the amount of auditing (i.e., moving to a deep audit level that increases the amount of data collected as compared with a normal level of auditing) when a security assessment has low fidelity. Subfield 913 shows that for an assessment having medium fidelity, the edge firewall $105_2$ increases the auditing level and also restricts Internet access to the suspected compromised machine to only "white list" URLs which typically include sites that are known to not be malicious. When the fidelity is high, as shown by subfield 916, access to the Internet is blocked completely.

Field $903_2$ shows the response policy configuration for the host security endpoint $105_1$ (FIG. 1). For a security assessment having low fidelity and indicating a compromised machine with critical severity, the host security endpoint $105_1$ increases the amount of auditing to a deep audit level, as indicated by subfield 920. Subfield 923 indicates that for the cases of medium and high fidelity, the host security endpoint $105_1$ increases its auditing, and also increases performs a deep scan of it hosts (where a "deep" scan may entail the computer to be rebooted one or more times).

Field $903_N$ shows the response policy configuration for the line-of-business security endpoint $105_N$ (FIG. 1). For a security assessment having low fidelity and indicating a compromised machine with critical severity, the line-of-business security endpoint $105_N$ increases the amount of auditing to a deep audit level, as indicated by subfield 926. Subfield 932 indicates that for a security assessment having medium fidelity, the line-of-business security endpoint $105_N$ increases its data collection to a deep audit, and also restricts file attachments to e-mail. Subfield 935 indicates that for a security assessment having high fidelity, line-of-business security endpoint $105_N$ blocks all instant messaging ("IM") traffic.

Field 941 shows the response policy configuration for the ESAS central server 216 in FIG. 2. For a security assessment having high fidelity, the ESAS central server 216, as indicated in subfield 943, executes a port shutdown for the affected machine and generates an alert that the associated user account has been suspended. As with the subfields discussed above, subfield 943 is typically arranged to accept user-defined input.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for performing adaptive data collection in an endpoint of an enterprise security environment, the method comprising the steps of:

receiving a security assessment at a server that describes an object in the environment, the security assessment being a tentative assignment of security meaning to information relating to the object and further comprising a plurality of fields, at least one of the fields is a fidelity field that is arranged to express a degree of confidence an endpoint has in the security assessment, the security assessment being arranged to provide contextual meaning to the object and being defined with an estimated time interval over which the security assessment is valid;

switching from a first data collection mode to a second data collection mode in the server responsively to the received security assessment, the second data collection mode collecting a larger subset of available data in the environment than is collected while in the first data collection mode;

analyzing the collected larger subset of available data; and rolling-back to the first data collection mode upon expiration of the estimated time interval.

2. The method of claim 1 in which the first data collection mode is arranged for collecting summary data describing the object and the second data collection mode is arranged for collecting detailed data describing the object.

3. The method of claim 2, wherein said analyzing the collected larger subset of available data comprises analyzing the collected detailed data by applying an algorithm or process, the algorithm or process being arranged for determining an occurrence of a security breach.

4. The method of claim 3 including a further step of generating a security assessment in response to the analyzing the collected larger subset of available data.

5. The method of claim 3 including a further step of rolling back to the first data collection mode in response to the analyzing the collected larger subset of available data.

6. The method of claim 1 including a further step of persistently storing the collected subset in accordance with a retention policy.

7. The method of claim 1 in which the object is one of host, user, destination, or enterprise.

8. An enterprise security management product configured to perform adaptive data collection in an endpoint of an enterprise security environment, the product comprising:

an endpoint coupled to a security assessment channel, the endpoint including a server, the security assessment channel configured to receive a security assessment that describes an object in the environment, the security assessment being a tentative assignment of security meaning to information relating to the object and further comprising a plurality of fields, at least one of the fields is a fidelity field that is arranged to express a degree of confidence an endpoint has in the security assessment, the security assessment being arranged to provide contextual meaning to the object and being defined with an estimated time interval over which the security assessment is valid;

the endpoint configured to switch from a first data collection mode to a second data collection mode responsively to the received security assessment, the second data collection mode collecting a larger subset of available data in the environment than is collected while in the first data collection mode;

the endpoint configured to analyze the collected larger subset of available data; and the endpoint configured to roll-back to the first data collection mode upon expiration of the estimated time interval.

9. The product of claim 8, wherein the first data collection mode is configured to collect summary data describing the object and the second data collection mode is configured to collect detailed data describing the object.

10. The product of claim 9, wherein the endpoint is configured to analyze the collected detailed data by applying an algorithm or process, the algorithm or process being arranged for determining an occurrence of a security breach.

11. The product of claim 10, wherein the endpoint is configured to generate a security assessment in response to the analysis of the collected detailed data.

12. The product of claim 10, wherein the endpoint is configured to roll back to the first data collection mode in response to the analysis of the collected detailed data.

13. The product of claim 8, wherein the endpoint is configured to persistently store the collected subset in accordance with a retention policy.

14. The product of claim 8, wherein the object is one of host, user, destination, or enterprise.

15. An endpoint, comprising:

a computer coupled to a security assessment channel, the security assessment channel configured to receive a security assessment at a server that describes an object in the environment, the security assessment being a tentative assignment of security meaning to information relating to the object and further comprising a plurality of fields, at least one of the fields is a fidelity field that is arranged to express a degree of confidence an endpoint has in the security assessment, the security assessment being arranged to provide contextual meaning to the object and being defined with an estimated time interval over which the security assessment is valid;

the computer configured to switch from a first data collection mode to a second data collection mode responsively to the received security assessment, the second data collection mode collecting a larger subset of available data in the environment than is collected while in the first data collection mode;

the computer configured to analyze the collected larger subset of available data; and the computer configured to roll-back to the first data collection mode upon expiration of the estimated time interval.

16. The endpoint of claim 15, wherein the first data collection mode is arranged for collecting summary data describing the object and the second data collection mode is arranged for collecting detailed data describing the object.

17. The endpoint of claim 15, where in the object is one of host, user, destination, or enterprise.

18. The endpoint of claim 16, wherein the computer is configured to roll back to the first data collection mode in response to the analysis of the collected detailed data.

19. The endpoint of claim 16, wherein the computer is configured to analyze the collected detailed data by applying an algorithm or process, the algorithm or process being arranged for determining an occurrence of a security breach.

20. The endpoint of claim 16, wherein the computer is configured to generate a security assessment in response to the analysis of the collected detailed data.

* * * * *